W. J. & C. L. BERRY.
Butter-Firkins.
No. 156,531. Patented Nov. 3, 1874.
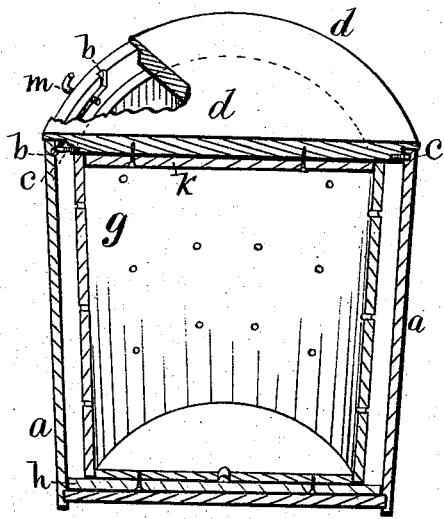
Witnesses:
C. C. Perkins
R. G. Orwig
Wallace James Berry
Charles L. Berry } Inventors
Thomas G. Orwig, Attorney

UNITED STATES PATENT OFFICE.

WALLACE J. BERRY AND CHARLES L. BERRY, OF MARSHALLTOWN, IOWA; SAID C. L. BERRY ASSIGNOR TO SAID W. J. BERRY.

IMPROVEMENT IN BUTTER-FIRKINS.

Specification forming part of Letters Patent No. 156,531, dated November 3, 1874; application filed June 5, 1874.

*To all whom it may concern:*

Be it known that we, WALLACE JAMES BERRY and CHARLES L. BERRY, of Marshalltown, Iowa, have invented a Double Butter-Firkin, of which the following is a specification:

Our invention consists in a double firkin having a movable cover that closes both vessels at the same time, and adapts the firkin to contain butter in the center, with a preserving liquid surrounding it, as hereinafter fully set forth.

Our drawing is a perspective view of a half-section, and illustrates the construction and operation of our invention.

$a\ a$ is the outside vessel, of common firkin form, and may vary in shape and dimensions as desired. $b\ b$ represent a horizontal groove, inside and near the top edge, with a vertical inlet for the dowel-pin $c$ in the movable cover $d$. A corresponding groove is required on the opposite side. $g$ is the inner vessel, corresponding in form and dimensions with the outside vessel $a\ a$, but small enough to allow a vacant space between the walls of the two vessels. It may be made of any suitable non-corrosive, porous, or perforated material that will retain the butter, and yet allow the preserving-liquid to come into contact with the butter. A cleat or cleats, $h$, permanently attached to the bottom and extending to reach the wall of the outside vessel $a$, serves to retain the inside vessel $g$ in the center of the outside vessel. $k$ is a cleat, permanently attached on the under side of the movable cover $d$, and enters the inside vessel $g$, and, in combination with the rabbeted edge or periphery of the cover, serves to retain the inside vessel $g$ stationary in the center of the outside vessel $a\ a$. $m$ is a set-screw that passes horizontally from the outside of the vessel $a$ into the cover $d$, and serves to lock the movable cover securely upon the tops of the two vessels $a$ and $g$.

In the operation and practical use of our invention, the inside vessel is filled with butter or any similar perishable product, and the vacant space between the two vessels then filled with any suitable preserving liquid, compound, or substance. The cover is then placed in position to allow its dowel-pins or projections $c$ to enter the grooves $b$. The lid is then revolved, to make the pins slide in the grooves, and engage and clamp the cover to the vessel. The set-screw $m$ is then turned, to enter the cover and hold it rigidly.

An index may be used on the outside vessel and the cover, to indicate when the screw-holes in the vessel $a$ and cover $d$ register, and to determine the position of the pins $c$ relative to their vertical inlets to the grooves $b$.

A faucet at the bottom of the outside vessel may be used for drawing off or filling in the preserving-liquid.

We are aware that double vessels have been used for preserving butter and similar products; but we claim that our manner of closing two vessels simultaneously with one cover is new and greatly advantageous.

We claim as our invention—

The cover $d$, having a cleat, $k$, and dowel-pins $c\ c$, in combination with the vessels $a$ and $g$, substantially as described, as a means of simultaneously closing the two vessels $a$ and $g$, for the purposes specified.

WALLACE JAMES BERRY.
CHARLES L. BERRY.

Witnesses:
I. F. MEEKER,
GEO. W. KLEIN.